(12) United States Patent
Sawada et al.

(10) Patent No.: US 6,838,168 B2
(45) Date of Patent: Jan. 4, 2005

(54) ANTI-FOGGING THERMOPLASTIC RESIN SHEET AND FORMED ARTICLE

(75) Inventors: Hidetsugu Sawada, Moriyama (JP); Tsuyoshi Fukukita, Ritto (JP); Mamoru Fukuoka, Yachimata (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/359,278

(22) Filed: Feb. 6, 2003

(65) Prior Publication Data

US 2003/0232209 A1 Dec. 18, 2003

(30) Foreign Application Priority Data

Feb. 20, 2002 (JP) ........................................ 2002-043075

(51) Int. Cl.[7] .......................... B32B 27/30; B32B 27/32; B32B 27/36; C09K 3/18
(52) U.S. Cl. ........................ 428/341; 428/480; 428/521; 428/522; 428/523; 428/910
(58) Field of Search ................................ 428/341, 480, 428/521, 522, 523, 910

(56) References Cited

U.S. PATENT DOCUMENTS 5,814,684 A 9/1998 Yoshioka .................... 523/169

FOREIGN PATENT DOCUMENTS

EP 0599150 A1 6/1994
JP 2001-145983 5/2001

OTHER PUBLICATIONS

Database WPI—XP–002235315—JP Pub. No. 2002003630 (Jan. 9, 2002).
Database WPI—XP–002235314—JP Pub. No. 2000345106 (Dec. 12, 2000).
Database WPI—XP–002235316—JP Pub. No. 11166061 (Jun. 22, 1999).
Database WPI—XP–002235317—JP Pub. No. 5098054A (Apr. 20, 1993).
European Search Report dated Apr. 3, 2003.

*Primary Examiner*—D. S. Nakarani
(74) *Attorney, Agent, or Firm*—Armstrong, Kratz, Quintos, Hanson & Brooks, LLP

(57) ABSTRACT

An anti-fogging thermoplastic resin sheet is provided which has a remarkably improved strength in an anti-fogging coating film thereof, inhibiting coating film breakage during the forming, and which exerts excellent anti-fogging effects even in the case of a deep drawn formed articles and can prevent transfer of the anti-fogging coating film to the opposite surface when the anti-fogging thermoplastic resin sheet is wound in a roll. A formed article having excellent anti-fogging effects is also provided. A thermoplastic resin sheet comprising polystyrene, a polymer alloy of polystyrene and a rubber, a high-impact styrene resin, a copolymer of styrene and an acrylic monomer, polyolefin, polyethylene terephthalate, polyvinyl chloride or polyvinylidene chloride comprises on the surface thereof an anti-fogging coating film comprising a surfactant (A) and cyclodextrin or a water-soluble compound (B) in which hydroxyl groups of cyclodextrin are modified.

6 Claims, No Drawings

ANTI-FOGGING THERMOPLASTIC RESIN SHEET AND FORMED ARTICLE

BACKGROUND OF THE INVENTION

1. Field of the Invention

The present invention relates to an anti-fogging agent having excellent anti-fogging effects, an anti-fogging thermoplastic resin sheet comprising a coating film of the anti-fogging agent, and a formed article formed from the anti-fogging thermoplastic resin sheet by thermoforming.

2. Description of Related Art

Sheets produced by extruding various thermoplastic resins into films have been widely used as packaging containers for food and as packaging containers for other goods after being thermoformed into formed articles using vacuum forming machines, hot plate pressure forming machines, or a vacuum pressure forming machines. Among these resin sheets, resin sheets made of a transparent resin such as polystyrene, polyethylene terephthalate, or polypropylene are widely used as materials for lids of lunch boxes, side-dish containers or the like because of transparency. Such a thermoplastic resin sheet used as materials for lids of lunch boxes, side-dish containers or the like is coated with a surfactant such as sucrose fatty acid ester on one surface thereof in order to prevent fogging when the formed article is filled with the contents, and is then thermoformed into a formed article so that the surface subjected to an anti-fogging treatment constitutes the inner surface.

However, the formed articles coated with the surfactant are generally unsatisfactory in anti-fogging effects and also caused problems in that water droplets formed on the inner surface of the formed article, thereby obscuring the view of the contents and drastically reducing the commercial value when the formed article is filled with contents.

Particularly in the case in which the resin sheet is thermoformed using the hot plate pressure forming machine, since the sheet is heated while contacting the sheet surface coated with an anti-fogging agent with a hot plate, the anti-fogging agent peeled off and irregularities of the hot plate are transferred onto the resin sheet surface, thereby roughening the surface, and thus anti-fogging effects are drastically reduced. Also, there occurred problems in that a formed article suited for use in a refrigerated showcase is difficult to obtain because of poor anti-fogging effects in low temperature environment.

To solve this problem, Japanese Unexamined Patent Application, First Publication No. 2001-145983 discloses a technique of improving anti-fogging effects, particularly anti-fogging effects at low temperature in a food packaging formed article using an anti-fogging agent comprising a nonionic surfactant such as sucrose fatty acid ester and an organic acid alkali metal salt such as L-sodium tartrate (Japanese Unexamined Patent Application, First Publication No. 2001-145983 (see claims, paragraph number 0006)).

However, the technique disclosed in Japanese Unexamined Patent Application, First Publication No. 2001-145983 had a problem in that since the anti-fogging coating film formed on the sheet surface has poor strength, the anti-fogging coating film breaks at the drawn portion, and anti-fogging effects are drastically reduced when formed into a deep drawn formed article. Also, there occurred a problem in that when the resin sheet comprising the coating film of the anti-fogging agent is wound in a roll, the anti-fogging agent is likely to transfer to the surface (hereinafter referred to as "the opposite surface") opposite the surface coated with the anti-fogging agent, and anti-fogging effects of the formed article are reduced.

BRIEF SUMMARY OF THE INVENTION

An object to be achieved by present invention is to provide an anti-fogging thermoplastic resin sheet which has a remarkably improved strength in an anti-fogging coating film thereof, inhibiting coating film breakage during the thermoforming, and which exerts excellent anti-fogging effects even in the case of a deep drawn formed articles and can prevent transfer of the anti-fogging coating film to the opposite surface when the anti-fogging thermoplastic resin sheet is wound in a roll. Another object is to provide a formed article having excellent anti-fogging effects.

To achieve the above objects, the present inventors have intensively researched and found that by using, as an anti-fogging agent to be applied on the surface of the thermoplastic resin sheet, a surfactant (A) and cyclodextrin or a water-soluble compound (B) in which hydroxyl groups of cyclodextrin are modified, superior anti-fogging characteristics of the formed article can be obtained and transfer of the anti-fogging agent to the opposite surface can be satisfactorily prevented when the sheet is wound in a roll, and thus the present invention has been completed.

The present invention is directed to an anti-fogging thermoplastic resin sheet comprising a thermoplastic resin sheet and an anti-fogging coating film formed on the surface of the thermoplastic resin sheet, wherein the anti-fogging coating film comprises a surfactant (A) and cyclodextrin or a water-soluble compound (B) in which hydroxyl groups of cyclodextrin are modified, and the thermoplastic resin sheet comprises at least one thermoplastic resin selected from the group consisting of polystyrene, polymer alloy of polystyrene and rubber, high-impact styrene resin, copolymer of styrene and acrylic monomer, polyolefin, polyethylene terephthalate, polyvinyl chloride and polyvinylidene chloride.

Furthermore, the present invention is directed to a method of producing a formed article, which comprises forming the anti-fogging thermoplastic resin sheet by thermoforming.

According to the present invention, it is made possible to provide an anti-fogging thermoplastic resin sheet which has a remarkably improved strength in an anti-fogging coating film thereof, inhibiting coating film breakage during the thermoforming, and which exerts excellent anti-fogging effects even in the case of a deep drawn formed articles and can prevent transfer of the anti-fogging coating film to the opposite surface when the anti-fogging thermoplastic resin sheet is wound in a roll, and it is also made possible to provide a formed article having excellent anti-fogging effects.

Accordingly, the formed article obtained by thermoforming the anti-fogging thermoplastic resin sheet of the present invention is particularly suited for use as anti-fogging transparent lids for food containers such as lunch boxes, side-dish containers, sushi containers, sashimi containers and the like because of excellent initial anti-fogging effects immediately after the food is packaged.

DETAILED DESCRIPTION OF THE INVENTION

The present invention will now be described in detail.

Examples of the surfactant (A) used in the present invention include nonionic surfactant, anionic surfactant and cationic surfactant used in the industrial fields.

Specific examples of the nonionic surfactant include sorbitan fatty acid ester, sucrose fatty acid ester, polyglycerin fatty acid ester and polyoxyethylene derivative.

Specific examples of the anionic surfactant include fatty acid salt such as sodium laurate or sodium oleate, alkyl sulfate such as sodium lauryl sulfate, higher alcohol sulfate ester salt such as lauryl alcohol sulfate ester salt, lauryl alcohol sulfate ester salt or oleyl alcohol sulfate ester salt, and alkylbenzenesulfonate.

Specific examples of the cationic surfactant include aliphatic amine salts, quaternary ammonium salts and alkyl pyridinium salt.

Among these, sucrose fatty acid ester as the nonionic surfactant is preferred because the coating film constituting the anti-fogging layer has sufficient strength and also has excellent anti-fogging effects.

The sucrose fatty acid ester can be obtained by transesterifying sucrose with a lower alcohol ester of fatty acid, such as fatty acid methyl ester. Specifically, it is preferably a transesterification product of sucrose and a saturated or unsaturated fatty acid having 10 to 18 carbon atoms in view of anti-fogging effects.

Specific examples of the sucrose fatty acid ester include sucrose stearate ester, sucrose palmitate ester, sucrose laurate ester and sucrose oleate ester. Although these sucrose fatty acid esters may be any of monoester, diester, and triester compounds and mixtures thereof, one in which a monoester compound is a main component is preferred because anti-fogging effects are particularly excellent.

The sucrose fatty acid ester having a hydrophilic-lipophilic balance (HLB) of 13 to 17 is particularly preferred. When the HLB is 13 or more, anti-fogging effects are excellent. On the other hand, when the HLB is 17 or less, adhesion with a substrate sheet and the strength of the coating film constituting the anti-fogging layer are excellent.

Therefore, when using plural kinds of sucrose fatty acid esters, a mixture is preferably prepared so that the HLB value of the mixture is controlled within a range from 13 to 17.

The surfactant (A) can also be used as a mixture of the sucrose fatty acid ester and other nonionic, anionic or cationic surfactant. In view of excellent anti-fogging effects of the sucrose fatty acid ester and anti-fogging duration, the amount of the sucrose fatty acid ester is preferably 50% by weight or more, and particularly preferably 80% by weight or more, based on the total surfactant (A).

Cyclodextrin, or cyclodextrin in the water-soluble compound (B) in which hydroxyl groups of cyclodextrin are modified used in the present invention, is obtained by hydrolyzing a starch with an acid or an enzyme.

The number of D-glucose units (containing an α1→4 bond or a β1→4 bond of a D-glucopyranose ring as a unit) constituting cyclodextrin is preferably 20 or fewer per molecule, and α-cyclodextrin comprising mutually bonded 6 D-glucose units, β-cyclodextrin comprising mutually bonded 7 D-glucose units and γ-cyclodextrin comprising mutually bonded 8 D-glucose units are particularly preferred because the strength of the anti-fogging coating film constituting the anti-fogging layer is enhanced.

The water-soluble compound in which hydroxyl groups of cyclodextrin are modified is a compound in which hydroxyl groups existing in various cyclodextrins described above are modified with a low-molecular weight organic compound and entire molecules exhibit water solubility.

Specific examples thereof include alkylated cyclodextrin such as dimethylcyclodextrin, trimethylcyclodextrin or diethylcyclodextrin; acylated cyclodextrin such as triacetylcyclodextrin, tripropionylcyclodextrin or tributyrylcyclodextrin; hydroxyalkylated cyclodextrin such as hydroxypropylcyclodextrin; and compound in which hydroxyl groups of cyclodextrin are modified with monosaccharides or disaccharides.

Among these, a compound in which hydroxyl groups of cyclodextrin are modified with monosaccharides or disaccharides is particularly preferred because it has excellent affinity with water and excellent wettability with a substrate, and also easily forms an anti-fogging coating film having sufficient strength.

Examples of the compound in which hydroxyl groups of cyclodextrin are modified with monosaccharides include glucosylcyclodextrin in which hydroxyl groups of cyclodextrin are modified with D-glucose, α-D-glucopyranose or β-D-glucopyranose; fructosylcyclodextrin in which hydroxyl groups of cyclodextrin are modified with D-furanose, α-D-fructofuranose or β-D-fructofuranose; and galactosylcyclodextrin in which hydroxyl groups of cyclodextrin are modified with D-galactose, α-D-galactopyranose or β-D-galactopyranose.

Examples of the compound in which hydroxyl groups of cyclodextrin are modified with disaccharides include maltosylcyclodextrin in which hydroxyl groups of cyclodextrin are modified with maltose.

In the present invention, in the case of forming the anti-fogging coating film, straight-chain or branched dextrin can be appropriately used in combination with cyclodextrin or the water-soluble compound (B) in which hydroxyl groups of cyclodextrin is modified. In this case, the number of the D-glucose unit constituting dextrin is preferably 20 or less in view of water solubility and the compound (B) is preferably used in the amount of 15% by weight or more, and particularly preferably 35% by weight or more, based on the total weight of the straight-chain or branched dextrin and cyclodextrin or the water-soluble compound (B) in which hydroxyl groups of cyclodextrin is modified.

Furthermore, hydroxyl groups of the straight-chain or branched dextrin may be modified and examples of the compound include alkyl esterified dextrin, hydroxyalkylated dextrin, acetylated dextrin, phosphorylated dextrin and α-dextrin.

With respect to a mixing ratio of the respective components constituting the anti-fogging coating film, the amount of cyclodextrin or the water-soluble compound (B) in which hydroxyl groups of cyclodextrin are modified is preferably within a range from 5 to 60 parts by weight, and particularly preferably from 20 to 50 parts by weight, based on 100 parts by weight of the surfactant (A), because excellent anti-fogging effects are exerted regardless of the thermoforming method and the mold shape and thus a formed article having excellent anti-fogging effects can be obtained and, furthermore, an anti-fogging coating film, which is less likely to be transferred onto the opposite surface, is formed when an anti-fogging thermoplastic resin sheet comprising a coating film of the anti-fogging agent on one surface thereof is wound in a roll.

The anti-fogging coating film described in detail above may contain polydimethylsiloxane or polymethylphenylsiloxane, in addition to the above respective components, in view of the slipperiness of the sheet and the formed article.

The amount of the anti-fogging agent formed on the thermoplastic resin sheet is preferably within a range from 5 to 1000 mg/m$^2$ in terms of dry solid content. When the amount is within the above range, anti-fogging effects are enhanced and poor appearance due to coating unevenness can be prevented. The amount is particularly preferably within a range from 5 to 150 mg/m² because these effects become remarkable.

The thermoplastic resin sheet constituting the anti-fogging thermoplastic resin sheet of the present invention comprises at least one thermoplastic resin selected from the group consisting of polystyrene, polymer alloy of polystyrene and rubber, high-impact styrene resin, copolymer of styrene and acrylic monomer, polyolefin, polyethylene terephthalate, polyvinyl chloride and polyvinylidene chloride. The thermoplastic resin sheet is used as formed articles such as materials for food packaging lids after thermoforming.

The polystyrene includes syndiotactic polystyrene and isotactic polystyrene, in addition to general-purpose polystyrene known as GPPS.

The polymer alloy of polystyrene and a rubber is a polymer-alloyed resin obtained by mixing polystyrene with a rubber such as styrene-butadiene block copolymer, styrene-butadiene-styrene block copolymer, styrene-isoprene-styrene block copolymer, styrene-isoprene-butadiene-styrene block copolymer or styrene-ethylene-butadiene-styrene block copolymer. In this case, with respect to the content of the rubber, the content of a butadiene block in the alloy is preferably 20% or less on the weight basis in view of the formability.

Examples of the high-impact styrene resin include (i) high-impact polystyrene obtained by graft polymerization of styrene in the presence of polybutadiene and (ii) transparent high-impact styrene resin obtained by graft copolymerization of styrene and methyl (meth)acrylate in the presence of a styrene-butadiene block copolymer or a styrene-butadiene-styrene block copolymer.

Specific examples of the copolymer of styrene and an acrylic monomer include styrene-(meth)acrylic acid copolymer, styrene-meleic anhydride copolymer, styrene-alkyl (meth)acrylate ester copolymer and rubber-modified styrene resin.

Examples of the polyolefin include propylene resin such as polypropylene, propylene-butadiene copolymer or ethylene-propylene copolymer.

Examples of the polyester resin include polyethylene terephthalate, polybutylene terephthalate, poly-1,4-cyclohexanedimethylene terephthalate, and copolymer of polyethylene terephthalate and poly-1,4-cyclohexanedimethylene terephthalate. Among these, polyethylene terephthalate and poly-1,4-cyclohexanedimethylene terephthalate are preferred in view of the thermoformability.

Examples of the polyvinyl resin include polyvinyl chloride and polyvinylidene chloride.

The thermoplastic resin sheet is preferably transparent when using it as materials for food packaging lids. In this case, two or more kinds of the resins described above may be mixed as long as the transparency of the sheet is not adversely affected.

Among the thermoplastic resins, polystyrene, polymer alloy of polystyrene and rubber, high-impact styrene resin, and copolymer of styrene and acrylic monomer are particularly preferred because they are superior in thereomoformability and have very high hydrophobicity in themselves as compared with other thermoplastic resins, and thus anti-fogging effects are remarkably improved. Regarding the thermoplastic resin sheet comprising these resins, the resin itself has low polarity and the thermoforming is often conducted by a hot plate pressure forming method, and thus anti-fogging effects of the formed article are drastically reduced upon thermoforming. Therefore, when used for the following purposes, anti-fogging effects, particularly anti-fogging effects immediately after packaging the contents are remarkably improved.

The thermoplastic resin sheet comprising the thermoplastic resin described in detail above may have a single-layered structure or a multi-layered structure comprising the same or different kind of the resin. When using polystyrene, polymer alloy of polystyrene and rubber, or copolymer of styrene and acrylic monomer as the material of the thermoplastic resin sheet, the sheet is preferably subjected to a biaxial drawing treatment. The drawing ratio may be within a conventional range and, for example, the ratio is 2 to 4 times in the extrusion direction upon sheet forming, while it is 2 to 4 times in the direction perpendicular to the extrusion direction.

For the purpose of preventing the thermoplastic resin sheet from becoming blocked, the thermoplastic resin sheet may contain various fine particles for forming protrusions on the sheet surface as long as the transparency of the sheet is not adversely affected. Examples of the fine particles include crosslinked resin beads such as styrene crosslinked resin beads, (meth)acrylate ester crosslinked resin beads, or polyurethane crosslinked resin beads; fine inorganic particles made of silica, hydrophobized silica, spherical silica, precipitated calcium carbonate, titanium oxide, or talc; and fine rubber particles. An example of a method for adding the fine rubber particles is to additionally use a rubber-containing resin. The rubber-containing resin used herein differs from the thermoplastic resin used as a base material of the resin sheet, and examples thereof include high-impact polystyrene (HIPS), styrene-acrylonitrile-butadiene copolymer (ABS), styrene-ethylene-butadiene-styrene copolymer (SEBS), styrene-butadiene-(meth)acrylate ester copolymer (MBS), and high-impact (meth)acrylate ester (HI-PMMA).

The thickness of the thermoplastic resin sheet is preferably within a range from 0.05 to 1.0 mm because of good thermoformability.

The method of forming an anti-fogging coating film on the surface of the thermoplastic resin sheet is preferably a method of dissolving, as an essential component, a surfactant (A) and cyclodextrin or a water-soluble compound (B) in which hydroxyl groups of cyclodextrin are modified in an aqueous medium to prepare an anti-fogging agent, and applying the anti-fogging agent on the surface of the thermoplastic resin sheet, followed by drying.

The method of preparing the anti-fogging agent is not specifically limited and, for example, a surfactant (A) and cyclodextrin or a water-soluble compound (B) in which hydroxyl groups of cyclodextrin are modified are used as an essential component and then dissolved in a solvent such as aqueous medium, together with various additive components, if necessary.

The aqueous medium of the anti-fogging agent is preferably water or a solution of water and an alcohol such as ethanol. When using the solution of water and ethanol, good antiseptic property can be imparted to the anti-fogging agent.

The total solid content in the anti-fogging agent is preferably within a range from 0.1 to 40% by weight. When total solid content is within the above range, the anti-fogging agent is easily applied and poor appearance due to coating unevenness is less likely to occur. The total solid content is particularly preferably within a range from 0.2 to 10% by weight because these effects become remarkable.

As described above, regarding the ratio of the surfactant (A) to cyclodextrin or the water-soluble compound (B) in which hydroxyl groups of cyclodextrin are modified in the anti-fogging coating film, the amount of the latter is within a range from 5 to 60 parts by weight, and preferably from 20 to 50 parts by weight, based on 100 parts by weight of the former. It is preferred to control this to such a ratio.

As described above, in the case in which polydimethylsiloxane or polymethylphenylsiloxan is mixed in the anti-fogging coating film, a silicone emulsion containing polydimethylsiloxane or polymethylphenylsiloxan as a main component may be dispersed in the anti-fogging agent as long as effects of the present invention are not adversely affected.

The method of applying the anti-fogging agent on the thermoplastic resin sheet is not specifically limited, but is preferably a method of applying the anti-fogging agent in the form of a solution as described above. Specific examples thereof include a method of subjecting the surface of a resin sheet to a hydrophilization treatment, applying the anti-fogging agent on the treated surface, and drying the solvent.

Examples of the coater of the anti-fogging agent used herein include a spray coater, roll coater, gravure coater, knife coater, air knife coater, rotor dampening machine, and applicator.

Examples of the hydrophilization treatment of the resin sheet surface include acid treatment, flame treatment, and corona treatment. The wetting coefficient of the sheet surface subjected to the hydrophilization treatment is preferably 38 mN/m or more, and particularly preferably from 45 to 60 mN/m in order to uniformly apply the anti-fogging agent and to obtain sufficient anti-fogging effects. As used herein, "wetting coefficient" is a value measured by the procedure described in JIS K-6786 (the same procedure was similarly applied in the following).

As described above, the amount of the anti-fogging agent to be coated is within a range from 5 to 1000 mg/m$^2$, and preferably from 5 to 150 mg/m$^2$ in terms of dry solid weight, because anti-fogging effects are enhanced and poor appearance due to coating unevenness is less likely to occur.

In the anti-fogging thermoplastic resin sheet of the present invention, it is preferred to apply silicone oil or an emulsion thereof, or a lubricant of another kind on the surface opposite the surface having an anti-fogging coating film in the thermoplastic resin sheet in order to improve slipperiness between anti-fogging thermoplastic resin sheets or to improve releasability between the formed article and the mold and releasability between formed articles. In this case, silicone oil may be added, and surfactants and lubricants each having the antistatic effect may be added in the emulsion.

In the case in which silicone oil or an emulsion thereof, or a lubricant of another kind is applied on the opposite surface in order to prevent transfer of the anti-fogging coating film onto the opposite surface, the opposite surface is preferably subjected to a hydrophilization treatment such as corona treatment. When the opposite surface is not subjected to the hydrophilization treatment, the wetting coefficient of the opposite surface before coating is maintained at a low value and it is made possible to prevent transfer onto the opposite surface.

In the case in which silicone oil or an emulsion thereof is applied on the opposite surface, the coating weight after the coating is dried is preferably within a range from 5 to 150 mg/m$^2$. When the coating weight is within the above range, a good coated state is obtained and the slipperiness is enhanced.

A formed article can be obtained by forming the anti-fogging thermoplastic resin sheet of the present invention by thermoforming. In the present invention, since the anti-fogging coating film does not easily break even in the case of a deep drawn formed article, good anti-fogging effects are exerted even at the drawn portion.

For example, it is noticeable that excellent anti-fogging effects are exerted even in the case of formed articles having a draw ratio (drawing depth/length of opening portion) within a range of from 0.05 to 1.0 and formed articles having a complicated shape.

Thermoforming of the anti-fogging thermoplastic resin sheet can be conducted by a conventional vacuum forming method, a conventional hot plate pressure forming method or a conventional vacuum pressure forming method using a vacuum forming machine, a hot plate pressure forming machine or a vacuum pressure forming machine while heating using a direct heating system or an indirect heating system. However, when using a biaxially oriented sheet as the thermoplastic resin sheet, the sheet is preferably formed by the hot plate pressure forming method or vacuum pressure forming method using the direct heating system.

In the case of thermoforming using a hot plate pressure forming machine, the present invention has a feature that peeling off of the anti-fogging agent coating film and transfer of unevenness from the hot plate surface of the forming machine when the anti-fogging coating film and the hot plate are in contact can be effectively prevented, which are likely to be caused when a conventional sheet is used.

EXAMPLES

The following Examples further illustrate the present invention in detail; however, the present invention is not limited to these Examples.

Example 1

An anti-fogging agent (1) having a solid content of 1.3% by weight was prepared by dissolving 280 parts by weight in total (solid content: 130 parts by weight), for example, 250 parts by weight (solid content: 100 parts by weight) of sucrose laurate ester (A-1) and 30 parts by weight of α-cyclodextrin (B-1) (Seldex A-100, purity: 98.5% by weight or more, manufactured by NIHON SHOKUHIN KAKO CO., LTD.) in 9720 parts by weight of distilled water.

One surface of a 0.30 mm thick biaxially oriented polystyrene sheet whose surface is not subjected to a coating treatment ("DIC SHEET GK", manufactured by Dainippon Ink and Chemicals, Inc.) was subjected to a corona treatment at a wetting coefficient of 50 mN/m, and then the corona-treated surface was coated with the resulting anti-fogging agent (1) diluted appropriately with distilled water at a coating weight of 45 mg/m$^2$ by solid content using an electric coater, "MODEL YOA-A" manufactured by Yoshimitsu Seiki Co., Ltd. with an applicator, followed by drying using a dryer to obtain an anti-fogging thermoplastic resin sheet (1).

With respect to quantitative analysis of the coating weight of the anti-fogging agent, an infrared absorption spectrum of the sheet surface was measured by the multiple internal reflection method (ATR method) using Fourier transform infrared spectroscopy (FTIR) and a working curve was made by using a standard sample whose coating weight is known, and then determination was conducted (the same procedures were similarly applied in the following).

The resulting anti-fogging thermoplastic resin sheet (1) was formed into a formed article (1) in the following mold using a hot plate pressure forming machine at a hot plate temperature of 130° C.

Mold: 94 mm in length, 94 mm in width and 30 mm in depth (corner portion: 2R)

Draw ratio (drawing depth/length of opening portion)= 0.31

Evaluation of Transfer Resistance of Anti-fogging Agent

A biaxially oriented styrene sheet, whose surface is not subjected to a surface treatment, having a wetting coefficient of 33 mN/m was dipped in a 30-fold dilute solution of silicone emulsion (KM-788, manufactured by SHIN-ETSU CHEMICAL CO., LTD.) and, after squeezing using a rubber roller, the styrene sheet was dried using a dryer to obtain a silicone oil-coated sheet (1).

On the surface coated with the anti-fogging agent of the anti-fogging thermoplastic resin sheet (1), the silicone oil-coated sheet (1) was laid and a pressure of 0.5 MPa was applied using a hot press. After standing at a temperature of 85° C. for 30 minutes, quantitative analysis of the amount of the anti-fogging agent of the surface coated with the anti-fogging agent of the anti-fogging thermoplastic resin sheet (1) was conducted by FTIR, and then the transfer rate of the anti-fogging agent was calculated by the following equation 1. The evaluation was conducted according to the following criteria. The results are shown in Table 1.

Transfer rate (%) of anti-fogging agent=(coating weight before the test−coating weight after the test)/(coating weight before the test)×100 (Equation 1)

Evaluation Criteria

⊚: transfer rate of anti-fogging agent <5%

○: 5%≦transfer rate of anti-fogging agent <10%

Δ: 10%≦transfer rate of anti-fogging agent <20%

X: 20%≦transfer rate of anti-fogging agent

Evaluation of Anti-fogging Effects of Formed Article

After charging 100 ml of tap water at 25° C. in a formed article having the same shape as that of the formed article (1), as a bottom material, the bottom material was capped with the formed article (1) and sealed with tape on four sides to obtain a sample, which was then allowed to stand in a refrigerator showcase (PHO-5Y, manufactured by SANDEN Corporation) at 5° C. for 5 and 30 minutes. Then, the ratio of water droplets adhering on the top of the formed article (1) was visually observed according to the following criteria. The evaluation of the sample standing for 5 minutes was taken as the evaluation of initial anti-fogging effects, while the evaluation of the sample standing for 30 minutes was taken as the evaluation of anti-fogging effects. The results are shown in Table 1.

⊚: area to which water droplets adhere <5% (film of water uniformly forms on the surface and no fogging occurs on the top surface)

○: 5%≦area to which water droplets adhere <10% (large water droplets adhere and fogging occurs on a portion of the top surface)

Δ: 10%≦area to which water droplets adhere <50% (small water droplets adhere and fogging occurs on approximately half the top surface)

X: 50%≦area to which water droplets adhere (fine water droplets adhere and fogging occurs on the entire top surface)

Example 2

An anti-fogging agent (2) having a solid content of 1.3% by weight was prepared by dissolving 280 parts by weight in total (solid content: 130 parts by weight), for example, 250 parts by weight (solid content: 100 parts by weight) of sucrose laurate ester (A-1) and 30 parts by weight of a cyclodextrin mixture 1 (B-2) (Seldex TB-50 as a mixture of straight-chain dextrin and cyclodextrin, manufactured by NIHON SHOKUHIN KAKO CO., LTD., cyclodextrin content: 40% by weight) in 9720 parts by weight of distilled water.

In the same manner as in Example 1, except that the resulting anti-fogging agent (2) was used, an anti-fogging thermoplastic resin sheet (2) and a formed article (2) were obtained. In the same manner as in Example 1, except that the resulting sheet and formed article were used, the transfer resistance of the anti-fogging agent and anti-fogging effects of the formed article were evaluated. The results are shown in Table 1.

Example 3

An anti-fogging agent (3) having a solid content of 1.3% by weight was prepared by dissolving 280 parts by weight in total (solid content: 130 parts by weight), for example, 250 parts by weight (solid content: 100 parts by weight) of sucrose laurate ester (A-1) and 30 parts by weight of a cyclodextrin mixture 2 (B-3) (Isoelite P, manufactured by ENSUIKO Sugar Refining Co., Ltd., maltosylcyclodextrin content: 55% by weight, cyclodextrin content: 27% by weight, other dextrin content: 18% by weight) in 9720 parts by weight of distilled water.

In the same manner as in Example 1, except that the resulting anti-fogging agent (3) was used, an anti-fogging thermoplastic resin sheet (3) and a formed article (3) were obtained. In the same manner as in Example 1, except that the resulting sheet and formed article were used, the transfer resistance of the anti-fogging agent and anti-fogging effects of the formed article were evaluated. The results are shown in Table 1.

Comparative Example 1

A comparative anti-fogging agent (1') having a solid content of 1.3% by weight was prepared by dissolving only 325 parts by weight (solid content: 130 parts by weight) of sucrose laurate ester (A-1) in 9675 parts by weight of distilled water.

In the same manner as in Example 1, except that the resulting comparative anti-fogging agent (1') was used, a comparative anti-fogging thermoplastic resin sheet (1') and a comparative formed article (1') were obtained. In the same manner as in Example 1, except that the resulting sheet and formed article were used, the transfer resistance of the anti-fogging agent and anti-fogging effects of the formed article were evaluated. The results are shown in Table 2.

Comparative Example 2

A comparative anti-fogging agent (2') having a solid content of 1.3% by weight was prepared by dissolving 280 parts by weight in total (solid content: 130 parts by weight), for example, 250 parts by weight (solid content: 100 parts by weight) of sucrose laurate ester (A-1) and 30 parts by weight of sodium L-tartrate (dihydrate) in 9720 parts by weight of distilled water.

In the same manner as in Example 1, except that the resulting comparative anti-fogging agent (2') was used, a comparative anti-fogging thermoplastic resin sheet (2') and a comparative formed article (2') were obtained. In the same manner as in Example 1, except that the resulting sheet and formed article were used, the transfer resistance of the anti-fogging agent and anti-fogging effects of the formed article were evaluated. The results are shown in Table 2.

TABLE 1

|  | Examples | | |
| --- | --- | --- | --- |
|  | 1 | 2 | 3 |
| Sucrose laurate ester (A-1) (parts by weight in terms of solid content) | 100 | 100 | 100 |
| α-cyclodextrin (B-1) (parts by weight) | 30 | | |
| Cyclodextrin mixture 1 (B-2) (parts by weight) | | 30 | |
| Cyclodextrin mixture 2 (B-3) (parts by weight) | | | 30 |
| Anti-fogging effects of formed article | | | |
| Initial anti-fogging effects (after 5 minutes) | ○–◎ | ○–◎ | ◎ |
| Anti-fogging effects (after 30 minutes) | ◎ | ◎ | ◎ |
| Transfer resistance of anti-fogging agent | ◎ | ○ | ◎ |

TABLE 2

|  | Comparative Examples | |
| --- | --- | --- |
| Items | 1 | 2 |
| Sucrose laurate ester (A-1) (parts by weight in terms of solid content) | 130 | 100 |
| Sodium L-tartrate (parts by weight) | | 30 |
| Anti-fogging effects of formed article | | |
| Initial anti-fogging effects (after 5 minutes) | X–Δ | Δ |
| Anti-fogging effects (after 30 minutes) | Δ | ○ |
| Transfer resistance of anti-fogging agent | X | Δ |

As is apparent from the results of Table 1 and Table 2, the formed articles obtained in Examples 1 to 3 were superior in both initial anti-fogging effects after standing for 5 minutes and anti-fogging effects after standing for 30 minutes. In contrast, the formed article of Comparative Example 1 were inferior in both initial anti-fogging effects after standing for 5 minutes and anti-fogging effects after standing for 30 minutes, while the formed article of Comparative Example 2 were inferior in initial anti-fogging effects after standing for 5 minutes. The anti-fogging thermoplastic resin sheets obtained in Examples 1 to 3 were superior in transfer resistance because transfer of the anti-fogging agent hardly occurred. In contrast, the anti-fogging thermoplastic resin sheets of Comparative Examples 1 and 2 were inferior in transfer resistance because transfer of the anti-fogging agent was likely to occur.

What is claimed is:

1. An anti-fogging thermoplastic resin sheet comprising a thermoplastic resin sheet and an anti-fogging coating film formed on the surface of the thermoplastic resin sheet, wherein the anti-fogging coating film comprises a surfactant (A) and cyclodextrin or a water-soluble compound (B) in which hydroxyl groups of cyclodextrin are modified, and the thermoplastic resin sheet comprises at least one thermoplastic resin selected from the group consisting of polystyrene, polymer alloy of polystyrene and rubber, high-impact styrene resin, copolymer of styrene and acrylic monomer, polyolefin, polyethylene terephthalate, polyvinyl chloride and polyvinylidene chloride.

2. The anti-fogging thermoplastic resin sheet according to claim 1, wherein the surfactant (A) is sucrose fatty acid ester.

3. The anti-fogging thermoplastic resin sheet according to claim 1, wherein the amount of the anti-fogging coating film to be coated is within a range from 5 to 150 mg/m$^2$.

4. The anti-fogging thermoplastic resin sheet according to claim 1, wherein the thermoplastic resin sheet is obtained by biaxial drawing of at least one thermoplastic resin selected from polystyrene, polymer alloy of polystyrene and rubber, and copolymer of styrene and acrylic monomer.

5. A formed article formed from the anti-fogging thermoplastic resin sheet of any one of claims 1 to 4 by thermoforming.

6. The formed article according to claim 5, wherein the thermoforming is conducted by a hot plate pressure forming method or a vacuum pressure forming method.

* * * * *